UNITED STATES PATENT OFFICE.

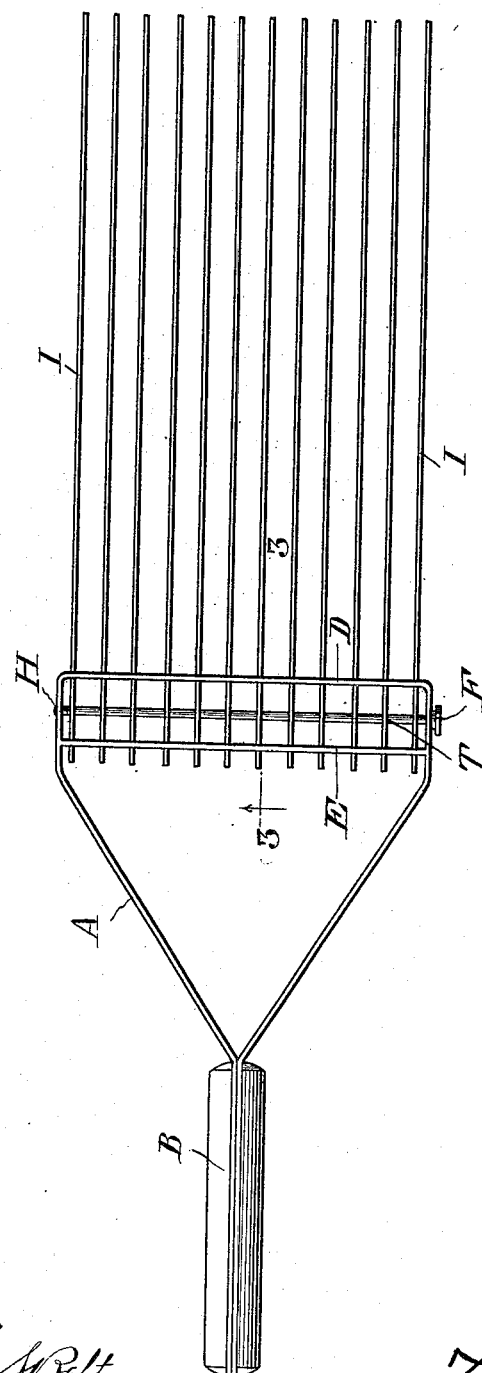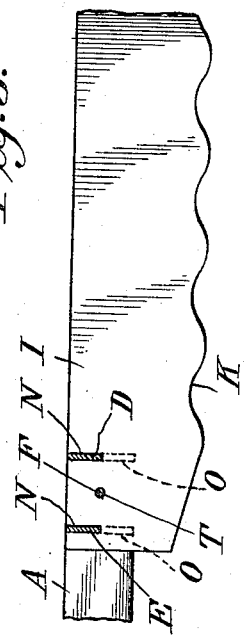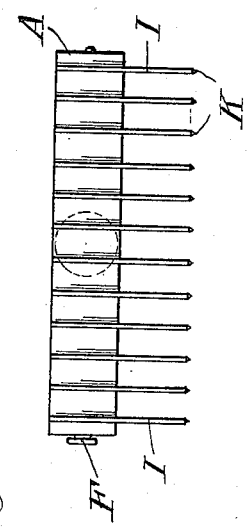

ISAAC F. ROBERTS, OF DALLAS, TEXAS.

BREAD-KNIFE.

1,176,317.  Specification of Letters Patent.  Patented Mar. 21, 1916.

Application filed August 6, 1915. Serial No. 44,055.

*To all whom it may concern:*

Be it known that I, ISAAC F. ROBERTS, a citizen of the United States, residing at Dallas, in the county of Dallas and State of Texas, have invented certain new and useful Improvements in Bread-Knives; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in bread knives and consists of a gang knife adapted to cut a plurality of slices or singly as may be desired.

The invention comprises a simple and efficient device of this nature having various details of construction, combinations and arrangements of parts which will be hereinafter fully described, shown in the accompanying drawings and then specifically defined in the appended claim.

My invention is illustrated in the accompanying drawings, in which:

Figure 1 is a top plan view of a knife made in accordance with my invention. Fig. 2 is an end view. Fig. 3 is a sectional view on line 3—3 of Fig. 1.

Reference now being had to the details of the drawings by letter, A designates a frame which may be of any suitable shape or size which is secured to a handle B. The cross-pieces D and E of said frame are parallel to each other and spaced apart. A screw, designated by letter F, is mounted in apertures in the opposite sides of the frames, one aperture H being threaded to engage the threaded portion of the screw, said screw being mounted in between and parallel with the parts D and E.

The knives are designated by letter I and each has a cutting edge K, preferably corrugated and sharpened, and the rear edge of each blade is provided with slots N adapted to interlock with slots O formed upon the cross-pieces D and E in the manner shown. Each blade is provided with an aperture T through which the screw passes, serving as a means for retaining the various knives.

In operation, the various knives may be arranged in the manner shown and spaced apart to cut the slices of uniform width, when a plurality of knives are used, the knives being held in place by the screw which is passed through registering apertures and held in the manner described.

What I claim to be new is:—

A knife for cutting bread, etc., comprising a frame having two parallel portions spaced apart and provided with oppositely disposed notches formed in corresponding edges thereof, apertured blades with notches therein and interlocking with the notches in said frame, the latter intermediate its parallel portions being provided with apertures which are in registration with the apertures of said blades, and a screw passing through said registering apertures.

In testimony whereof I hereunto affix my signature in presence of two witnesses.

ISAAC F. ROBERTS.

Witnesses:
W. ISAAC MCCALL,
W. T. SAVAGE.

Copies of this patent may be obtained for five cents each, by addressing the "Commissioner of Patents, Washington, D. C."